(12) United States Patent
Oakey et al.

(10) Patent No.: US 7,425,369 B2
(45) Date of Patent: Sep. 16, 2008

(54) HIGH-IMPACT, TRANSPARENT, DISTORTION-FREE POLYMERIC SHEET AND WINDSHIELD

(76) Inventors: Edwin J Oakey, 3201 Waldheim, Port Huron, MI (US) 48060; Rodney M Tinney, 10317 County Rd. 1016, Burleson, TX (US) 76028

( * ) Notice: Subject to any disclaimer, the term of this patent is extended or adjusted under 35 U.S.C. 154(b) by 1203 days.

(21) Appl. No.: 10/300,329

(22) Filed: Nov. 20, 2002

(65) Prior Publication Data

US 2003/0071381 A1    Apr. 17, 2003

Related U.S. Application Data

(62) Division of application No. 09/928,827, filed on Aug. 13, 2001, now Pat. No. 6,733,714.

(51) Int. Cl.
*B32B 27/00* (2006.01)
(52) U.S. Cl. .............. 428/412; 296/190.1; 296/84.1; 425/388
(58) Field of Classification Search .............. 269/190.1, 269/84.1; 428/412; 425/388
See application file for complete search history.

(56) References Cited

U.S. PATENT DOCUMENTS

| | | |
|---|---|---|
| 2,367,642 A | 1/1945 | Helwig |
| 3,001,901 A | 9/1961 | Barkley |
| 3,069,287 A | 12/1962 | Hudson |
| 3,341,391 A | 9/1967 | Hamilton et al. |
| 3,388,032 A | 6/1968 | Saunders |
| 3,458,388 A | 7/1969 | Moynihan |
| 3,567,057 A | 3/1971 | Landen |
| 3,655,432 A | 4/1972 | Hausslein et al. |

(Continued)

FOREIGN PATENT DOCUMENTS

EP    0 365 951    10/1989

(Continued)

OTHER PUBLICATIONS

Daniel J. Brunelle, GE Global Research, Niskayuna, NY, Encyclopedia of Polymer Science and Technology—Polycarbonates, Article Online Posting Date: Jan. 13, 2006, John Wiley & Sons, Inc., p. 1.*

*Primary Examiner*—Carol Chaney
*Assistant Examiner*—Elizabeth Robinson
(74) *Attorney, Agent, or Firm*—Harness, Dickey & Pierce, P.L.C.

(57) ABSTRACT

A base sheet of transparent polycarbonate material has a formed shape including a center portion and a peripheral portion. The center portion is formed by a non-contact forming operation occurring at a temperature above the glass transition temperature and below the melt temperature of the transparent polycarbonate material, thereby resulting in the center portion of the base sheet being free of visual distortion. A top coat layer is disposed over the base sheet. The top coat layer has a greater resistance to abrasion than the polycarbonate material and provides UV protection to the base sheet. A primer coating is disposed between the base sheet and the top coat layer to facilitate bonding therebetween. The peripheral portion can have a shape created by a contact forming operation occurring at a temperature above the glass transition temperature and below the melt temperature of the polycarbonate material.

11 Claims, 5 Drawing Sheets

U.S. PATENT DOCUMENTS

| | | | |
|---|---|---|---|
| 3,671,370 A | 6/1972 | Littell, Jr. | |
| 3,810,815 A | 5/1974 | Welhart et al. | |
| 3,900,655 A | 8/1975 | Wolgemuth et al. | |
| 4,045,269 A | 8/1977 | Voss et al. | |
| 4,121,870 A | 10/1978 | Oakey | |
| 4,143,587 A | 3/1979 | Fujii | |
| 4,159,206 A * | 6/1979 | Armbruster et al. | 106/287.12 |
| 4,185,069 A | 1/1980 | Smith et al. | |
| 4,278,414 A | 7/1981 | Weisner et al. | |
| 4,352,776 A * | 10/1982 | Weisner et al. | 264/522 |
| 4,603,329 A | 7/1986 | Bangerter et al. | |
| 5,075,166 A | 12/1991 | Sikorski et al. | |
| 5,182,065 A | 1/1993 | Piotrowski et al. | |
| 5,298,587 A | 3/1994 | Hu et al. | |
| 5,320,875 A | 6/1994 | Hu et al. | |
| 5,433,786 A | 7/1995 | Hu et al. | |
| 5,494,712 A | 2/1996 | Hu et al. | |
| 5,718,967 A | 2/1998 | Hu et al. | |
| 5,843,492 A | 12/1998 | McCorry | |
| 5,900,284 A | 5/1999 | Hu | |
| 6,113,839 A | 9/2000 | McAllister | |
| 6,367,361 B1 | 4/2002 | Christensen et al. | |
| 6,376,064 B1 | 4/2002 | Gasworth et al. | |
| 6,397,776 B1 | 6/2002 | Yang et al. | |
| 6,432,494 B1 | 8/2002 | Yang et al. | |
| 6,537,477 B1 | 3/2003 | Nichilo | |
| 6,733,714 B2 * | 5/2004 | Oakey et al. | 264/409 |
| 6,797,384 B2 | 9/2004 | Gasworth et al. | |
| 2003/0111160 A1 | 6/2003 | Bolognese et al. | |
| 2004/0048023 A1 | 3/2004 | Clieve | |

FOREIGN PATENT DOCUMENTS

EP      0 448 324      3/1991

* cited by examiner

HIGH-IMPACT, TRANSPARENT, DISTORTION-FREE POLYMERIC SHEET AND WINDSHIELD

CROSS REFERENCE TO RELATED APPLICATION

This is a divisional of an application filed Aug. 13, 2001 and assigned U.S. Ser. No. 09/928,827.

BACKGROUND AND SUMMARY OF THE INVENTION

The present invention relates generally to forming polymeric materials and more particularly to a method and apparatus for forming distortion-free polymeric materials.

Polymeric materials are used in a wide variety of applications. Typically, polymeric materials are used to manufacture transparent panels such as windows or windshields for various applications including aircraft, automobiles, motorcycles, boats and the like. Such applications, especially those for aircraft, require an extremely clear, undistorted, transparent panel, which is resistive to scratching and impact in order to afford the pilot a clear view of the surroundings.

Traditionally, acrylic plastic is used to form such transparent panels. Acrylic plastic is noted for its excellent optical properties and weatherability, having outstanding resistance to the effects of sunlight and exposure to the elements over long periods of time. Subjected to long term exposure to the elements, acrylic plastic does not experience significant yellowing or any other significant changes in its physical properties. Acrylic plastic, however, does not have as high an impact strength as do other polymeric materials and thus, are less preferred for applications where impact strength is of importance.

Polycarbonate is a high-performance thermoplastic with the characteristics of high impact strength, optical clarity, heat resistance and dimensional stability. Polycarbonate, on the other hand, does not include the same weatherability characteristics of acrylic plastic. However, the transparent panels, whether produced using acrylic plastic or polycarbonate, include a hard protective coating to prevent scratching, abrasions or other markings that would reduce the service life of the transparent panel. Further, the hard protective coating protects the base sheet, whether acrylic plastic or polycarbonate, from UV degradation. As a result, the transparent panel is protected from any degradation, such as yellowing, abrasion distorting, and the like, even though the base sheet (e.g. polycarbonate) would otherwise degrade from such exposure. Therefore, it is desirable in the industry to use polycarbonate for producing transparent panels because of its high impact strength, while it remains protected from UV degradation and abrasion by the protective coating which is applied regardless of the material used.

Traditionally, polymeric sheets of acrylic plastic are formed using molds that include contoured upper and lower surfaces. The contoured surfaces define the desired shape of the polymeric sheet, directly contacting the entire upper and lower surfaces of the polymeric sheet. Because of the hardness of the upper and lower surfaces of an acrylic plastic sheet, it may be formed in this manner without distorting the upper and lower surfaces. However, the upper and lower surfaces of a polycarbonate sheet are not as hard and therefore, when heated, may be distorted upon contact during the forming process. For this reason, the use of traditional molds, which directly contact the upper and lower surfaces of the polymeric sheet, are not desirable for forming polycarbonate sheets. Traditional molds have increased potential for distorting the surfaces of the polycarbonate sheet, thus producing an increased number of rejected panels and driving up production costs.

Accordingly, the present invention provides an apparatus for forming a polymeric material, such as polycarbonate. The present invention enables forming of a polycarbonate sheet without distorting the key visibility areas of the sheet. The apparatus of the present invention provides a forming mold including a first half having a bottom wall and a first side wall defining a first interior space and a first edge and a second half having a top wall and a second side wall defining a second interior space and a second edge. The first and second halves come together to clamp the peripheral edge portions of a sheet of polymeric material therebetween for forming the sheet whereby the sheet is vacuum drawn into one of the first and second interior spaces. A cooling mechanism is disposed within one of the first and second interior spaces and a sensing mechanism is attached to one of the first and second halves for sensing a draw depth of the sheet within one of the first and second interior spaces. The first edge is preferably contoured for defining a final edge contour of the sheet and the second edge correspondingly contoured for facilitating engagement of the first and second halves. Further, the first edge is preferably beveled and the second edge correspondingly beveled for facilitating engagement of the first and second halves.

In a preferred embodiment, a trimming mechanism is provided for trimming a perimeter of the sheet to a desired shape. A retention mechanisms is also provided and operatively supported by one of the first and second halves for biasing the sheet into contact with one of the first and second edges of the first and second halves.

The present invention further provides an improved method for forming a sheet of polymeric material. The method of the present invention includes the steps of: heating the sheet to a first temperature, retaining a sheet between first and second mold halves of a forming mold, generating a vacuum on one side of the sheet thereby drawing the sheet into an interior space of one of the first and second mold halves, and cooling the sheet from the first temperature to a second temperature upon achieving a specified draw depth of the sheet within one of the first and second mold halves. The method preferably includes the step of detecting a draw depth of the sheet within one of the first and second mold halves for initiating the cooling. Alternatively, the heated sheet may be formed by use of blow air to exert a pressure on the other side of the sheet in lieu of the vacuum forming process or perhaps by use of a combination of both blow air and vacuum on opposite sides of the sheet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
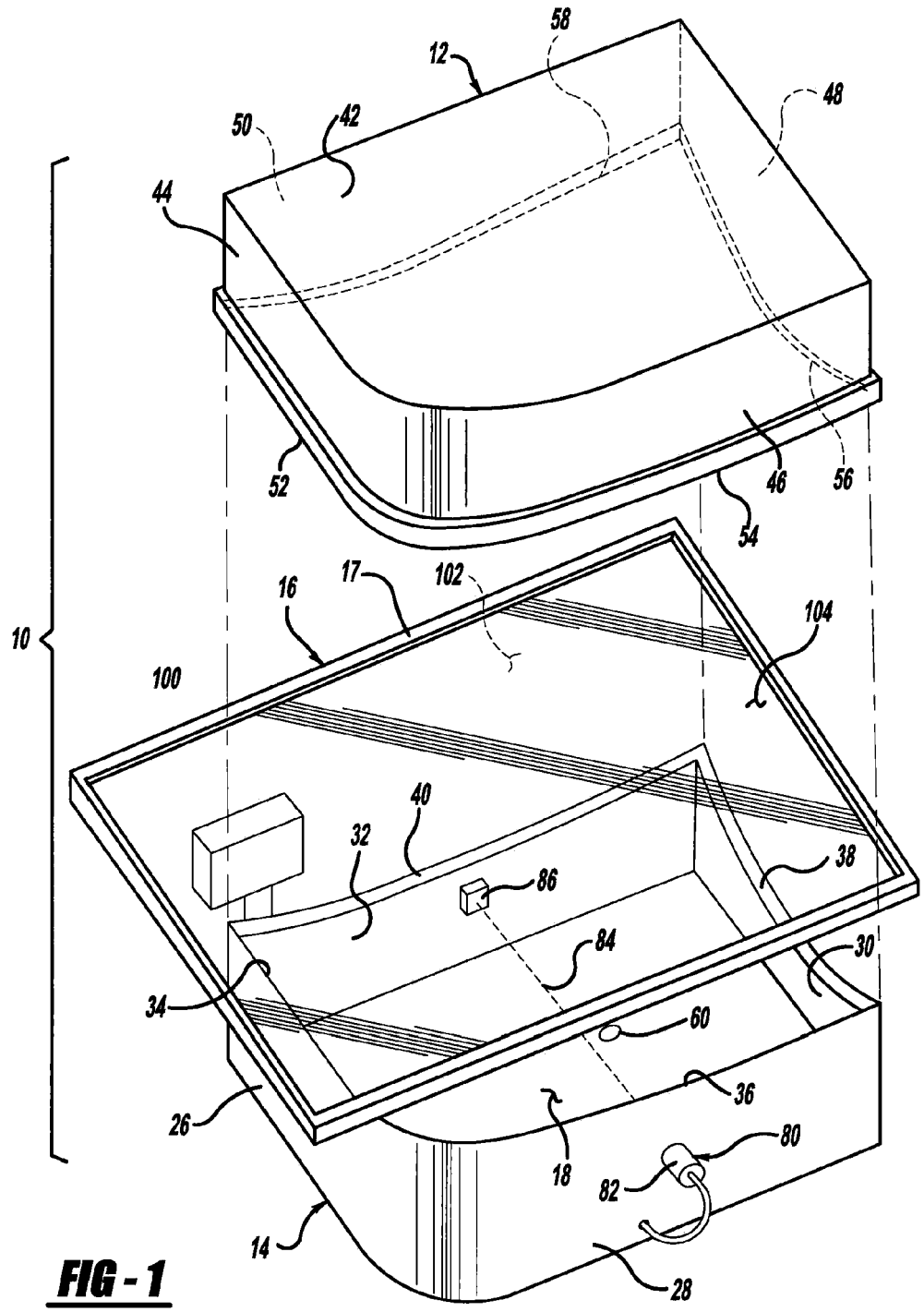
FIG. 1 is a perspective view of a forming mold in accordance with the present invention.

The following description of the preferred embodiments is merely exemplary in nature and is in no way intended to limit the invention, its application, or uses.

With reference to the Figures, there is shown a forming mold 10 including upper and lower halves 12,14 that come together to form a heated sheet of polymeric material 16 therebetween. The sheet 16 is preferably an optical quality polycarbonate material and is retained within a rigid frame 17 having a length and width somewhat greater than that of the upper and lower halves 12,14, and that clamps about the complete peripheral edge of the sheet 16. Edges of the upper and lower halves 12,14 are contoured to define a desired end form for peripheral edges of the sheet 16. A vacuum is created within an interior space 18 of the lower half 14 for drawing the sheet 16 downward, thereby forming the sheet 16 as defined by the contoured edges of the upper and lower halves 12,14. The drawing process ensues until the sheet 16 crosses a trigger point whereby the vacuum draw ceases and cooling mechanisms 20, disposed within an interior space 22 of the upper half 12, act to cool the sheet 16 in its desired end form. Alternatively, rather than drawing a vacuum in interior space 18, the gas pressure in interior space 18 may be increased by supplying pressurized gas thereto to exert a forming force on sheet 16 or both a vacuum within space 18 and increased gas pressure within space 22 may be utilized to accomplish the forming operation.

Figure 2:
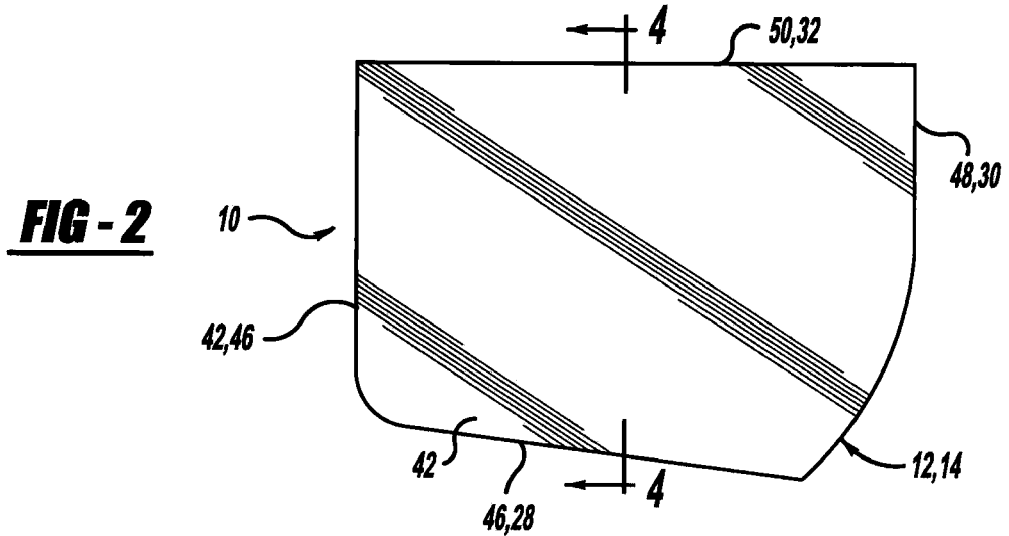
FIG. 2 is a top view of the forming mold of FIG. 1.

In an exemplary embodiment, the forming mold 10 is configured for forming an aircraft windshield. As best seen in FIG. 2, the perimeter of the forming mold 10 is correspondingly shaped for the particular application. It will be appreciated, however, that the forming mold 10 can be configured to form sheets 16 into various shapes and contours in accordance with the requirements of a variety of applications. The lower half 14 includes a bottom wall 24 and four sidewalls 26,28,30,32 defining the interior space 18. The sidewalls 26,28,30,32 have upper edges 34,36,38,40, respectively, and are selectively contoured along their lengths for defining the end form of the peripheral edge of sheet 16. The upper edges 34,36,38,40 are preferably beveled, sloping downward toward the interior of the lower half 14. The upper half 12 includes a top wall 42 and four sidewalls 44,46,48,50 defining the interior space 22. The sidewalls 44,46,48,50 have lower edges 52,54,56,58, respectively, and are correspondingly contoured along their lengths to engage the upper edges 34,36,38,40. The lower edges 52,54,56,58 are preferably beveled sloping downward toward the interior of the lower half 14 for corresponding alignment with the beveled upper edges 34,36,38,40. The lower half 14 further includes an opening 60 for drawing air from the interior space 22. In this manner, a vacuum may be created within the interior space 18 for forming the sheet 16, as will be described in further detail below.

Figure 5B:
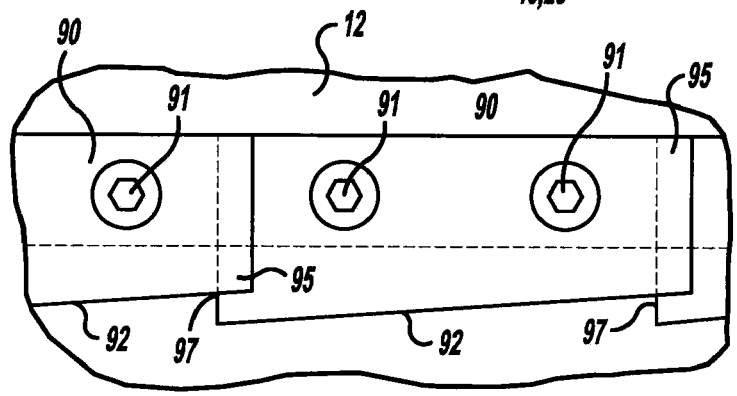
FIG. 5B is a view of an alternative embodiment of a trimming means.
Figure 4:
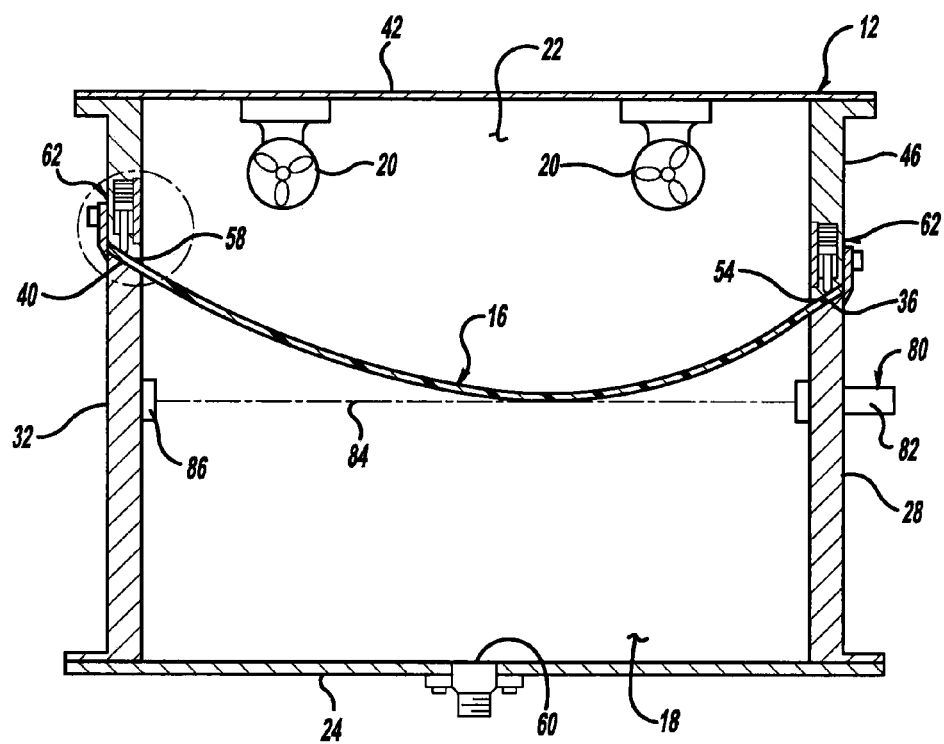
FIG. 4 is a sectional view of the forming mold taken along line 4-4 of FIG. 2.
Figure 5A:
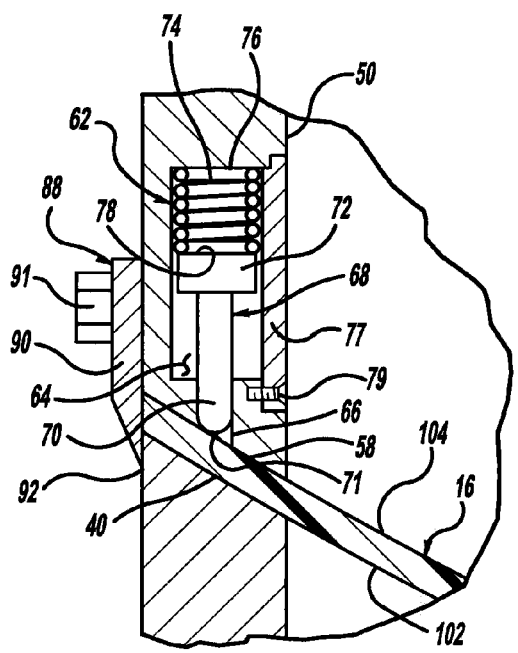
FIG. 5A is a detailed view of a retention mechanism of the forming mold.

As seen in FIG. 4 a series of retention mechanisms 62 are preferably included around the perimeter of the upper half 12 and are operatively disposed within the sidewalls 44,46,48,50 of the upper half 12. As best shown in FIG. 5A, the sidewalls 44,46,48,50 include a series of cavities 64 therein having openings 66 through the beveled lower edges 52,54,56,58. The retention mechanisms 62 each include a retention pin 68 that is partially disposed within the cavity 64. The retention pin 68 includes a pin portion 70 slidably disposed in and extending outwardly through the opening 66 and an enlarged diameter head 72 slidably disposed within the cavity 64. The pin portion 70 includes a rounded end face 71. The retention mechanism 62 further includes a spring 74 disposed between an upper face 76 of the cavity 64 and a top face 78 of the retention pin 68. The spring 74 biases the retention pin 68 downward through the opening 66. Also included is an access cover 77 for providing access to the cavity 64. The access cover 77 runs the length of the cavity 64 and is held in position by a series of screws 79. In this manner, the retention mechanisms 62 can be assembled into and accessed within the sidewalls 44, 46, 48, 50.

The retention mechanism 62 retains the sheet 16 in position between the upper and lower halves 12,14 throughout the hereindescribed forming process, whereby the rounded end face 71 of the pin portion 70 is biased into contact with the sheet 16. It will be appreciated, however, that the retention mechanisms 62 may be alternatively housed within the sidewalls 26,28,30,32 of the lower half 14, whereby the spring 74 biases the retention pin 68 upward through the opening 66.

A sensing mechanism 80 is provided and is mounted to the sidewall 28 of the lower half 14. In accordance with a first preferred embodiment, the sensing mechanism 80 includes a laser 82. The laser 82 selectively generates a beam of laser light 84 that travels across the interior space 18 of the lower half 14 and is reflected by a reflector 86, fixedly attached to the sidewall 32. The laser 82 includes a sensor for sensing the reflected beam 84. In accordance with a second preferred embodiment, the sensing mechanism 80 includes an optical sensor such as a video camera or the like. The beam emitted by the sensing mechanism 80 or the line of sight is positioned so as to be intersected and/or interrupted by the lowest most point of sheet 16 as it is formed to its finished shape. When this point is detected by sensor 80, sensor 80 generates a control signal to discontinue the vacuum as well as to trigger a cooling stage, as will be described in further detail hereinbelow.

The cooling mechanisms 20 are disposed within the interior space 22 of the upper half 14, fixedly attached to the top wall 42. In a first preferred embodiment, the cooling mechanisms 20 include fans for circulating air through the interior space 22 of the upper half 14. Alternatively, it is anticipated that the cooling mechanisms 20 may also include other air blowing or circulating means known in the art, such as blowing ducts and the like which may draw air from outside mold 10 or may include apparatus for cooling the air being circulated thereby. The cooling mechanisms 20 circulate cooling air for cooling the sheet 16 after forming, as described in further detail hereinbelow.

The forming mold 10 further includes trimming means 88 for trimming edges of the sheet 16 as defined by the external shape of the forming mold 10. In a first preferred embodiment, the trimming means 88 includes a series of blades 90 fixedly attached about the perimeter of the upper half 12 by bolts 91. The blades 90 extend downward past the lower edges 52,54,56,58 of the sidewalls 44,46,48,50 and include a sharpened leading edge 92. As the upper and lower halves 12,14 come together to retain the sheet 16 therebetween, the blades 90 simultaneously cut through the sheet 16, cutting away excess material and forming a perimeter of the sheet 16 as defined by the perimeter of the forming mold 10. As shown the pin portion 70 preferably extends past the leading edge 92 so as to contact the sheet 16 prior to the engagement of the sharpened leading edge 92 therewith so as to insure it is securely retained in position during the trimming operation. Additionally, it should be noted that in a preferred embodiment, as shown in FIG. 5B, there are a plurality of blades 90 along each edge with each leading edge 92 being angled relative to the surface of the sheet 16 so as to provide a series of progressive trimming sections along each side of sheet 16 and thus reduce the force required to accomplish same.

Figure 7:
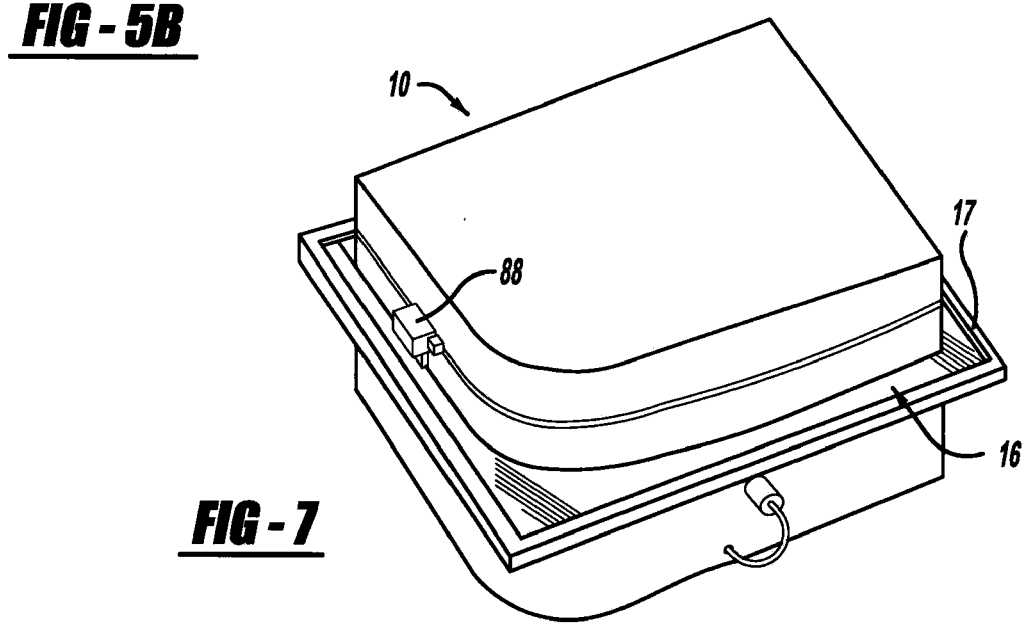
FIG. 7 is a perspective view of the forming mold including an alternative trimming means.

It is also anticipated that alternative trimming means 88 may be implemented for trimming the perimeter of the sheet 16. Such means include a laser, a high-speed water jet, and the like. In such an arrangement, a laser trimming or water jet trimming mechanism may be provided to orbit the perimeter of the forming mold 10, trimming away excess material as it travels. After the mold has been moved to a closed position. An exemplary embodiment of the alternative trimming means in detailed in FIG. 7.

A controller 100 is provided and is in electrical communication with various components of the forming mold 10, including the sensing mechanism 80 and the cooling mechanism 20. Depending upon the particular embodiment, the controller 100 may also be in electrical communication with laser or water jet trimming mechanisms for controlling their activity. The controller 100 controls the forming process as discussed in detail below.

Figure 8:
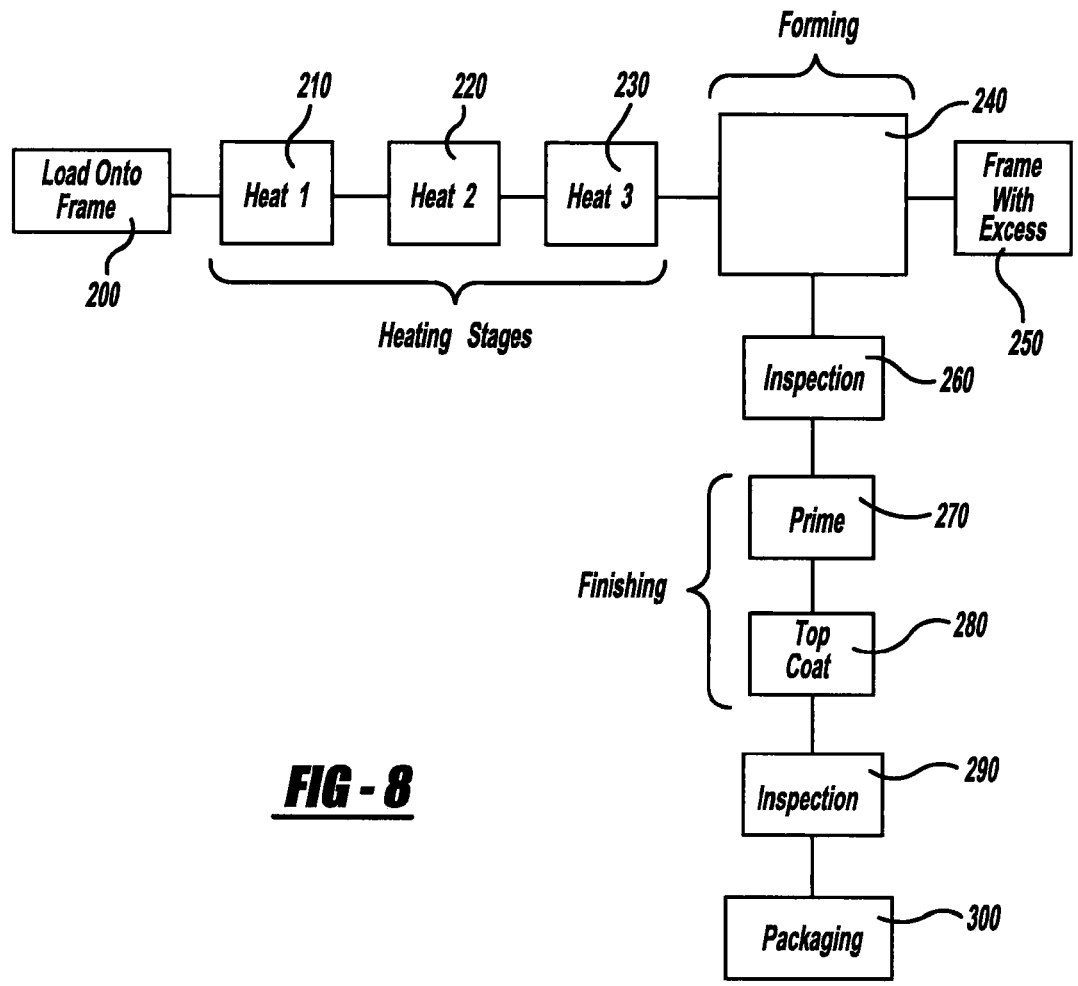
FIG. 8 is a schematic view of an exemplary processing line for forming the polymeric material.

The present invention provides a method of forming the sheet 16 of polymeric material, preferably utilizing the above-detailed forming mold 10. With particular reference to FIG. 8, the method of the present invention will be described in detail. Initially, at step 200, the sheet 16 is loaded into the frame 17. The sheet 16 is heated in one or more stages, represented as steps 210, 220, 230, until it is heated past a glass transition temperature, achieving a glass-transition stage, thereby becoming viscous or rubbery. It should be noted, however, that the sheet should not be heated to the point that it reaches a melting temperature, whereby the sheet would melt and become, scrap. The number of heating stages, their respective lengths and temperatures, may vary in accordance with the type of material and thickness of material used. Heating the sheet 16 in stages is believed preferable to avoid possible blistering or other deformation of the surface of the sheet 16 that could otherwise occur.

The sheet 16 is subsequently brought into the forming stage, at step 240, and placed on top of the lower half 14, with a bottom surface 102 resting on the upper edges 34,36,38,40 of the sidewalls 26,28,30,32. The upper half 12 travels downward in alignment with the lower half 14, whereby the lower edges 52,54,56,58 of the side walls 44,46,48,50 engage an upper surface 104 of the sheet 16 thereby forming the area around the periphery of the sheet 16 to the contour of edges 52,54,56,58 and retaining the sheet 16 between the upper and lower edges. The frame holds the perimeter of the sheet 16 in rigid form, and thus the sheet 16 is pulled and stretched as it is enclosed within the forming mold 10. Concurrently, the retention mechanisms 62 provide a downward force, biasing the bottom surface 102 of the sheet 16 into tight engagement with the upper edges 34,36,38,40 of the sidewalls 26,28,30, 32, creating an airtight seal therebetween. Additionally, the edges of the sheet 16 are trimmed in accordance with the perimeter shape of the forming mold 10. In accordance with the preferred embodiment, trimming of the sheet 16 occurs concurrently with the closing of the upper and lower halves 12,14, whereby the blades 90 cut through the sheet 16 as the upper half 14 engages the upper surface 104 of the sheet 16.

In an alternative embodiment, however, trimming may occur subsequent to the upper and lower halves 12,14 closing, whereby a laser or water-jet trimming mechanism travels about the perimeter of the forming mold 10 or the knives may be movable relative to upper half 12 and employ a separate activating mechanism to perform the trimming operation. Alternatively, the trimming operation may be performed once sheet 16 has been formed by any one of a laser, water-jet or separately actuated knives.

Figure 6:
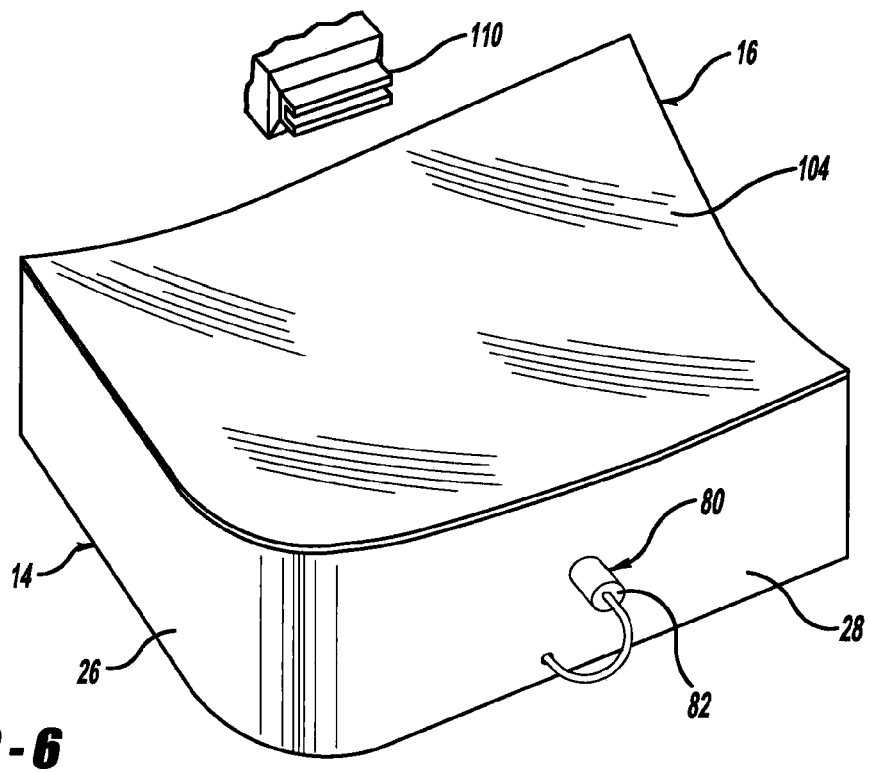
FIG. 6 is a perspective view of the lower half of the forming mold having a finished polymeric sheet resting thereon.
Figure 3:
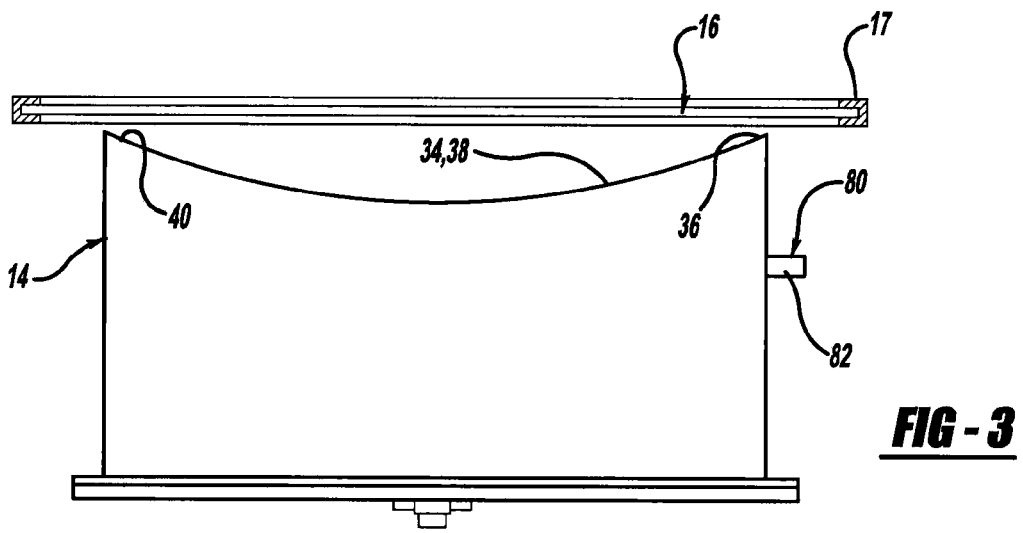
FIG. 3 is a side view of a lower half of the forming mold.

Once the sheet 16 is retained between the upper and lower halves 12,14, a vacuum is created within the interior space 18 of the lower half 12 by drawing air from the interior space 18, through the opening 60. The vacuum is achievable due to the airtight seal between the bottom surface 102 of the sheet 16 and the upper edges 34,36,38,40 of the sidewalls 26,28,30,32. As a result, the sheet 16 is drawn downward by the vacuum force into the interior space 18, thus forming the desired shape. The sensing mechanism 80 senses when the sheet achieves a particular draw depth within the interior space 18. Upon sensing the sheet 16 achieving the draw depth, the cooling mechanisms 20 are activated for cooling the sheet 16 below its glass-transition temperature, thereby again achieving a rigid state. The vacuum is held at steady state during the cooling process and is not relieved until the sheet 16 is sufficiently cooled. The cooling time of the sheet may be monitored by the controller 100, which controls each of the above-described activities. Once the sheet 16 is sufficiently cooled, the vacuum is relieved from the lower half 14 and the upper half 12 withdraws. The frame 17, with excess sheet material, are also withdrawn, thereby leaving the formed sheet 16 accessible for removal from the forming mold 10. This is best shown in FIG. 6. A secondary clamping mechanism 110 is used to grasp a perimeter edge of the sheet 16 and carry it through the remaining processes.

Subsequent to the forming process, the frame and excess material are carried away at step 250 for reprocessing of the excess material and the formed sheet 16 undergoes several finishing processes for producing an end product. These stages preferably include a first quality check, at step 260, primer and coating stages at steps 270, 280, respectively, and a second quality check at step 290. The first and second quality checks 260, 290 are preferably achieved using optical means, such as a camera, for checking the polymeric sheet 16 for any distortion, scratches and/or abrasions. The primer and coating stages 270, 280 preferably include a wash substep, preferably with water, to remove any dust or other particles from the surfaces of sheet 16 followed by a drying stage and then priming via dip, flow coating or spray process, a primer drying sub-step, a hard coat application by dip, flow coating or spraying process sub-step and a hard coat drying sub-step. It will be appreciated, however, that the hereindescribed finishing processes are merely exemplary in nature and may be substituted for or further include any one of a number of other finishing processes commonly known in the art. Finally, at step 300, the finished sheet 16 is packaged for customer delivery.

It should be noted that at least the primer and coating stages will be performed under strict temperature humidity and dust controlled conditions to ensure proper flow free coating of sheet 16. The primer coat may be of any suitable material capable of providing a clear distortion free bond with sheet 16 and the top coat. At present, the preferred primer and top coating materials are experimental materials supplied by General Electric Co. applied by a flow coating process that are believed to offer an improved life span of 8-10 years which is significantly longer than currently available materials which may be utilized for this purpose. Preferably the primer and hard coat will be applied to both surfaces of sheet 16.

Although FIG. 8 and the supporting description herein, describe a generally linear processing line for forming polymeric material, it will be appreciated by those skilled in the art that the processing line may vary in layout. For example, it is anticipated that the processing line may be a rotary line, whereby the processing steps are generally organized as a circle. In this manner, the sheet 16 rotates about the circular layout through each of the processing stages for forming the finished product.

While it will be apparent that the preferred embodiments of the invention disclosed are well calculated to provide the above-stated advantages, it will be appreciated that the invention is susceptible to modification, variation and change without departing from the proper scope or fair meaning of the subjoined claims.

What is claimed is:

1. A high-impact, transparent sheet comprising:
    a base sheet of transparent polycarbonate material having a glass transition temperature and a melt temperature, the base sheet having a non-planar shape comprising a first portion and a second portion;
    wherein the first portion has a shape created by a non-contact forming operation occurring at a temperature above the glass transition temperature and below the melt temperature of the transparent polycarbonate material; and
    wherein the second portion is a peripheral portion, said second portion has a non-planar shape at its outermost edge created by a contact forming operation occurring at a temperature above the glass transition temperature and below the melt temperature of the polycarbonate material, said second portion non-planar outermost edge having a non-planar contour; and
    wherein when said sheet rests on a plane, said second non-planar portion contour is spaced away from said plane such that portions of the periphery including said second non-planar portion contour are raised above and not in contact with said plane.

2. A high-impact, transparent sheet according to claim 1, wherein the first portion of the base sheet has opposing major surfaces, and further comprising:
    a topcoat layer disposed over at least one of the opposing surfaces, the topcoat layer having a greater resistance to abrasion than the base sheet of polycarbonate material and providing UV protection for the first portion of the base sheet.

3. A high-impact, transparent sheet according to claim 2, further comprising a primer coating disposed between the base sheet and the topcoat layer, the primer coating facilitating bonding therebetween.

4. A high-impact, transparent sheet according to claim 1, wherein the first portion is a center portion of the base sheet having opposing major surfaces, and further comprising:
    a topcoat layer disposed over each of the opposing surfaces, the topcoat layer having a greater resistance to abrasion than the base sheet of polycarbonate material and providing UV protection for the center portion of the base sheet; and
    a primer coating disposed between each of the opposing surfaces and the topcoat layer disposed over each of the opposing surfaces, the primer coating facilitating bonding therebetween.

5. A high-impact, transparent sheet according to claim 1, wherein said second peripheral portion has said outermost edge defined by a pair of opposing surfaces and a terminal end surface connecting the pair of opposing surfaces at the outermost edge, and said opposing surfaces are on a non-perpendicular angle with respect to said end surface.

6. A high-impact, transparent windshield comprising:
    a base sheet of transparent polycarbonate material having a glass transition temperature and a melt temperature, the base sheet being a windshield comprising a first portion and a second portion;
    wherein the first portion has a shape created by a non-contact forming operation occurring at a temperature above the glass transition temperature and below the melt temperature of the transparent polycarbonate material; and
    wherein the second portion is a peripheral portion, said second portion has a non-planar shape as its outermost edge created by a contact forming operation occurring at a temperature above the glass transition temperature and below the melt temperature of the polycarbonate material, said second portion non-planar outermost edge having a non-planar contour; and
    wherein when said sheet rests on a plane, said second non-planar portion contour is spaced away from said plane such that portions of the periphery including said second non-planar portion contour are raised above and not in contact with said plane.

7. A high-impact, transparent windshield according to claim 6, wherein the first portion of the base sheet has opposing major surfaces, and further comprising:
    a topcoat layer disposed over at least one of the opposing surfaces, the topcoat layer having a greater resistance to abrasion than the base sheet of polycarbonate material and providing UV protection for the first portion of the base sheet.

8. A high-impact, transparent windshield according to claim 7, further comprising a primer coating disposed between the base sheet and the topcoat layer, the primer coating facilitating bonding therebetween.

9. A high-impact, transparent windshield according to claim 6, wherein the first portion is a center portion of the base sheet having opposing major surfaces, and further comprising:
    a topcoat layer disposed over each of the opposing surfaces, the topcoat layer having a greater resistance to abrasion than the base sheet of polycarbonate material and providing UV protection for the center portion of the base sheet; and
    a primer coating disposed between each of the opposing surfaces and the topcoat layer disposed over each of the opposing surfaces, the primer coating facilitating bonding therebetween.

10. A high-impact, transparent windshield according to claim 6, wherein said second peripheral portion has said outermost edge defined by a pair of opposing surfaces and a terminal end surface connecting the pair of opposing surfaces at the outermost edge, and said opposing surfaces are on a non-perpendicular angle with respect to said end surface.

11. A high-impact, transparent windshield comprising:
    a base sheet of transparent polycarbonate material having a glass transition temperature and a melt temperature, the base sheet being a contoured non-planar windshield comprising a first portion and a second portion;
    wherein the first portion has a shape created by a non-contact forming operation occurring at a temperature above the glass transition temperature and below the melt temperature of the transparent polycarbonate material;

wherein the second portion has a shape created by a contact forming operation occurring at a temperature above the glass transition temperature and below the melt temperature of the polycarbonate material;

said second peripheral portion has an outermost edge defined by a pair of opposing surfaces and a terminal end surface connecting the pair of opposing surfaces at the outermost edge, and said opposing surfaces are on a non-perpendicular angle with respect to said end surface; and wherein when said sheet rests on a plane, said second non-planar portion contour is spaced away from said plane such that portions of the periphery including said second non-planar portion contour are raised above and not in contact with said plane.

* * * * *

UNITED STATES PATENT AND TRADEMARK OFFICE
CERTIFICATE OF CORRECTION

PATENT NO. : 7,425,369 B2  Page 1 of 1
APPLICATION NO. : 10/300329
DATED : September 16, 2006
INVENTOR(S) : Edward Oakey et al.

It is certified that error appears in the above-identified patent and that said Letters Patent is hereby corrected as shown below:

Title Page
Item [45] Date of Patent, "Sep. 16, 2008" should be --*Sep. 16, 2008--.
Item (*) Notice, insert the following --This patent is subject to a terminal disclaimer.--

Signed and Sealed this

Seventeenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO.       : 7,425,369 B2                                            Page 1 of 1
APPLICATION NO.  : 10/300329
DATED            : September 16, 2008
INVENTOR(S)      : Edward Oakey et al.

It is certified that error appears in the above-identified patent and that said Letters Patent is hereby corrected as shown below:

Title Page
Item [45] Date of Patent, "Sep. 16, 2008" should be --*Sep. 16, 2008--.
Item (*) Notice, insert the following --This patent is subject to a terminal disclaimer.--

This certificate supersedes the Certificate of Correction issued February 17, 2009.

Signed and Sealed this

Seventeenth Day of March, 2009

JOHN DOLL
*Acting Director of the United States Patent and Trademark Office*